United States Patent [19] … [11] Patent Number: 4,599,113
Lotsch et al. … [45] Date of Patent: Jul. 8, 1986

[54] ISOINDOLINE PIGMENT HAVING A HIGH COLOR STRENGTH

[75] Inventors: Wolfgang Lotsch, Beindersheim; Georg Henning, Ludwigshafen, both of Fed. Rep. of Germany

[73] Assignee: BASF Aktiengesellschaft, Ludwigshafen, Fed. Rep. of Germany

[21] Appl. No.: 634,432

[22] Filed: Jul. 26, 1984

[30] Foreign Application Priority Data

Jul. 30, 1983 [DE] Fed. Rep. of Germany ....... 3327563

[51] Int. Cl.$^4$ .................. C09B 57/04; C07D 239/62; C07D 471/02
[52] U.S. Cl. ............................. 106/288 Q; 544/284; 544/287; 544/300; 544/301
[58] Field of Search ............... 544/300, 301, 284, 287; 106/288 Q

[56] References Cited

U.S. PATENT DOCUMENTS

| | | | |
|---|---|---|---|
| 3,794,659 | 2/1974 | Leister et al. | 548/159 |
| 3,987,045 | 10/1976 | Bock et al. | 544/300 |
| 4,166,179 | 8/1979 | Lotsch | 524/89 |
| 4,262,120 | 4/1981 | von der Crone | 544/300 |
| 4,271,301 | 6/1981 | Lotsch et al. | 544/296 |
| 4,271,303 | 6/1981 | Vamvakaris et al. | 548/327 |
| 4,316,023 | 2/1982 | Henning et al. | 544/300 |
| 4,371,735 | 2/1983 | Scherer et al. | 544/300 |
| 4,480,097 | 10/1984 | Lotsch et al. | 544/296 |

FOREIGN PATENT DOCUMENTS

| | | | |
|---|---|---|---|
| 0038548 | 4/1981 | European Pat. Off. | 544/300 |
| 2041999 | 3/1972 | Fed. Rep. of Germany | 544/300 |
| 1187667 | 4/1970 | United Kingdom | |
| 1379409 | 1/1975 | United Kingdom | |
| 2013230 | 8/1979 | United Kingdom | 544/300 |
| 2014176 | 8/1979 | United Kingdom | |

Primary Examiner—Donald G. Daus
Assistant Examiner—Stephen M. Kapner
Attorney, Agent, or Firm—Oblon, Fisher, Spivak, McClelland & Maier

[57] ABSTRACT

A pigmentary form of isoindoline pigments which has high color strength is obtained if these pigments contain (a) a compound of the formula (I)

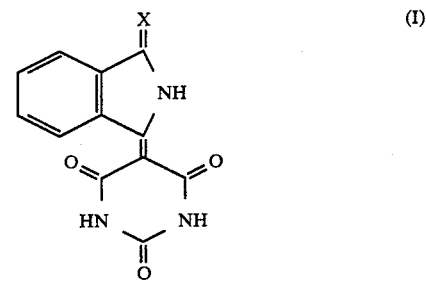

and
(b) one or more isoindoline compounds of the formula (II)

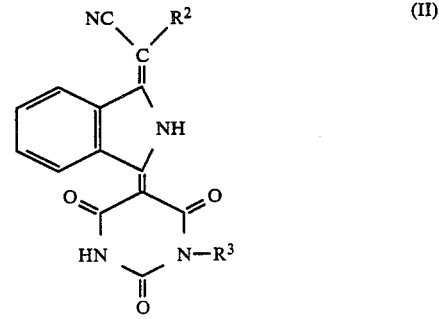

and the pigment is obtained by dry-blending (I) and (II) until the primary particles are $\leq 0.2$ μm and then heating the finished mill base in an organic liquid or in a mixture of water and an organic liquid. In the formulae, X is

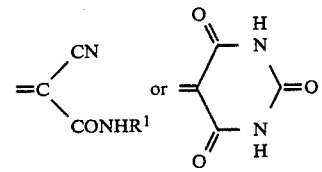

and $R^2$ is —CN, —CONHR$^4$, 2-quinazolonyl, 2-quinoxazolonyl or 2-benzimidazolyl, $R^3$ is hydrogen, alkyl or unsubstituted or substituted phenyl, $R^1$ is hydrogen or methyl, and $R^4$ is hydrogen, alkyl or phenyl, and the phenyl radical and/or the heterocyclic radicals can be further substituted. The compounds I and II differ from one another.

The color strengths of the resulting pigments are substantially superior to the prior art.

16 Claims, No Drawings

ISOINDOLINE PIGMENT HAVING A HIGH COLOR STRENGTH

Pigmentary forms of the isoindoline compounds of the formula

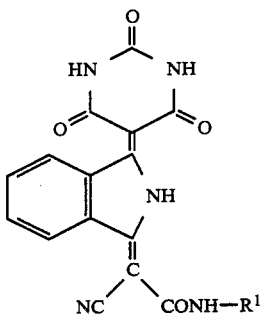

(III)

wherein $R^1$ is hydrogen or methyl, and their preparation are disclosed in U.S. Pat. Nos. 3,794,659 and 4,271,303 and British Pat. No. 2,013,230. These pigments are greenish yellow pigments which, depending on the preparation conditions, possess high color strength and poor hiding power, or low color strength and good hiding power. They are insoluble and are therefore very useful for coloring thermoplastics and baking finishes. Because they are very lightfast, they can be used particularly advantageously for printing packaging. However, the pigments III in which $R^1$ is hydrogen and those in which $R^1$ is methyl do not meet practical requirements, the former in particular with regard to color strength and the latter in particular with regard to transparency, so that none of the known pigmentary forms of (III) can be used as completely satisfactory alternatives to diarylide pigments of the type C.I. Pigment Yellow 12 and 13.

Pigmentary forms of the isoindoline compound of the formula

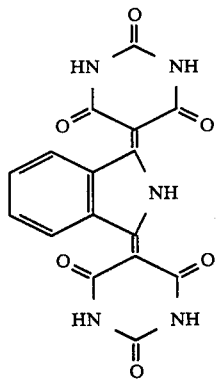

(V)

and their preparation are disclosed in German Laid-Open Application DOS No. 2,041,999, U.S. Pat. Nos. 4,166,179 and 4,271,301 and EP-A No. 38 548. These pigments are useful neutral to intensely reddish yellow pigments which, depending on the preparation conditions, possess high color strength and poor hiding power, or low color strength and good hiding power.

The high-hiding pigmentary forms of (V) which have lower color strength exhibit good weather-fastness in finishes and are very useful alternatives to inorganic pigments containing heavy metals. The pigmentary forms of (V) which have high color strength and a poorer hiding power are, like the diarylide pigments, very useful for coloring thermoplastics and printing inks. However, not all of the known pigmentary forms of (V) possess a color strength which meets practical requirements and permits them to be used as completely satisfactory alternatives to diarylide pigments of the type C.I. Pigment Yellow 12 and 13 and in particular 83.

It is an object of the present invention to provide pigmentary forms of (III) and (V) which have a substantially higher color strength than the prior art forms.

We have found that this object is achieved, and that an isoindoline pigment has a high color strength, if it contains (a) a compound of the formula

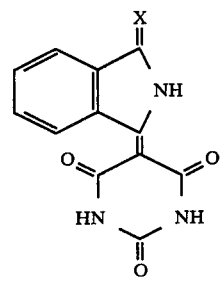

(I)

where X is

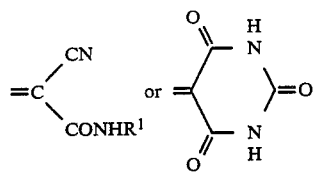

and $R^1$ is hydrogen or methyl, and (b) from 2 to 50% by weight, based on (a), of one or more isoindoline compounds of the formula

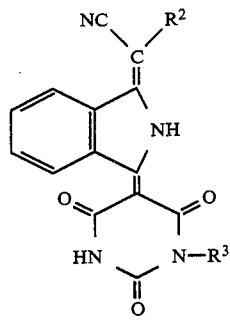

(II)

where $R^2$ is —CN, —CONH—$R^4$, 2-quinazolonyl, 2-quinoxazolonyl or 2-benzimidazolyl, $R^3$ is hydrogen or $C_1$–$C_4$-alkyl or is phenyl which is unsubstituted or substituted by chlorine, bromine, methyl, ethyl, methoxy or ethoxy, $R^4$ is hydrogen, $C_1$–$C_4$-alkyl or phenyl, and the phenyl radical $R^4$ and the heterocyclic radicals stated for $R^2$ are unsubstituted or substituted by chlorine, fluorine, bromine, carbamyl, N-$C_1$–$C_4$-alkylcarbamyl, N-phenylcarbamyl, $C_1$–$C_4$-alkyl, $C_1$–$C_4$-alkoxy, benzoylamino, $C_1$–$C_4$-alkanoylamino, $C_1$–$C_4$-alkoxycarbonyl or phenoxycarbonyl, and when X is $$=C\begin{matrix}CN\\ \\CONH_2\end{matrix},$$

$R^3$ or $R^4$ cannot be hydrogen, or when X is $$=C\begin{matrix}CN\\ \\CONH-CH_3\end{matrix},$$

$R^3$ cannot be hydrogen, and the pigment is obtained by dry-blending a mixture of (I) and (II) until the primary particles are $\leq 0.2$ μm, and then heating the finely divided agglomerated mill base in an organic liquid and water.

Compared with the prior art pigments, the novel pigmentary form of the invention possesses a substantially superior color strength and superior to high hiding power. In some cases, the novel pigmentary forms possess high color strength and substantially superior transparency. If the measures according to the invention are applied to the pure isoindoline compounds of the formulae III and V, high-hiding pigmentary forms having a low color strength are obtained. These have no advantages over the prior art pigmentary forms.

Suitable compounds (a) are isoindoline compounds of the formula I where X is an unsubstituted barbituric acid radical or a radical of the formula $$=C\begin{matrix}CN\\ \\CONH-R^1\end{matrix}$$

in which $R^1$ is hydrogen or methyl.

Suitable components (b) are isoindoline compounds of the formula II where $R^2$ is —CN, —CONH—$R^4$, 2-quinazolonyl, 2-quinoxazolonyl or 2-benzimidazolyl, $R^3$ is hydrogen, $C_1$–$C_4$-alkyl or unsubstituted or substituted phenyl and $R^4$ is hydrogen, $C_1$–$C_4$-alkyl or phenyl, and $R^3$ or $R^4$ cannot be hydrogen when, in component (a), X is $$=C\begin{matrix}CN\\ \\CONH_2\end{matrix},$$

and $R^3$ cannot be hydrogen when, in component (a), X is $$=C\begin{matrix}CN\\ \\CONH-CH_3\end{matrix}$$

The phenyl radical $R^4$ and/or the stated heterocyclic radicals can be further substituted.

Examples of components (a) are (III) [isoindoline structure with barbituric acid and CONH—$R^1$ groups]

and (V) [bis-barbituric isoindoline structure]

where $R^1$ has the above meanings.

Examples of suitable components (b), one or more of which must be present in the pigments according to the invention, are (IV) [isoindoline structure with N—$R^3$ barbituric and CONH—$R^5$ groups]

and (VI) [isoindoline structure with $R^2$ and barbituric groups]

where $R^5$ is hydrogen or $C_1$–$C_4$-alkyl and $R^2$ and $R^3$ have the above meanings.

Specific examples of $R^4$ in the radical —CONH—$R^4$, which has one of the meanings of $R^2$, are, in addition to hydrogen, $C_1$-$C_4$-alkyl, such as n-butyl, isobutyl, n-propyl, isopropyl, ethyl and methyl, and unsubstituted or substituted phenyl, such as phenyl, 2-, 3- and 4-tolyl, 4-bromophenyl, 3-fluorophenyl, 2-, 3- and 4-chlorophenyl, 2-, 3- and 4-methoxyphenyl, 2,4-dimethylphenyl, 3-chloro-4-methylphenyl, 2-carbomethoxyphenyl, 2-carbamylphenyl, 4-acetylaminophenyl and 4-benzoylaminophenyl.

$R^2$ may furthermore be —CN, 2-quinazolonly, 2-quinoxazolonyl or 2-benzamidazolyl, and the heterocyclic groups can be substituted by the abovementioned radicals, although they are preferably not further substituted.

Preferred isoindoline pigments are those which contain, as (a), an isoindoline compound of the formula (III) where $R^1$ is hydrogen or methyl, and, as (b), one or more isoindoline compounds of the formula (IV) where $R^3$ is hydrogen or $C_1$-$C_4$-alkyl or is phenyl which is unsubstituted or substituted by chlorine, bromine, methyl, ethyl, methoxy or ethoxy and $R^5$ is hydrogen or $C_1$-$C_4$-alkyl, and when $R^1$ is hydrogen, $R^3$ or $R^5$ cannot be hydrogen, or when $R^1$ is methyl, $R^3$ cannot be hydrogen.

Noteworthy pigments among these are those where, in (a), $R^1$ is hydrogen or methyl (formula III) and, in (b), $R^3$ is methyl, ethyl or phenyl and $R^5$ is methyl or ethyl (formula IV). In thise formulae, one of the radicals $R^3$ and $R^5$ may furthermore be hydrogen. Where $R^1$ is methyl, $R^3$ cannot be hydrogen.

Among the isoindoline pigments consisting of (III) and (IV), particularly noteworthy ones are those where, in (III), $R^1$ is hydrogen and, in (IV), one of the radicals $R^3$ and $R^5$ is hydrogen and the other is ethyl or, preferably, methyl, or those where, in (III), $R^1$ is methyl and, in (IV), $R^3$ is ethyl, phenyl or, preferably, methyl and $R^5$ is hydrogen.

We have found that the pigments obtained from 80-95, in particular 90, % by weight of (III) where $R^1$ is H (as (a)) and 20-5, in particular about 10, % by weight of (IV) where $R^3$ is —$CH_3$ and $R^5$ is H (as (b)) give an X-ray diffraction pattern which differs from that of the starting materials. The diffraction pattern is very similar to that of the compound (III) in which $R^1$ is —$CH_3$.

Pigments obtained from 90-50, in particular 60-50, % by weight of (III) where $R^1$ is —$CH_3$ (as (a)) and 10-50, in particular 40-50, % by weight of (IV) where $R^3$ is —$CH_3$ and $R^5$ is —H also give an X-ray diffraction pattern which differs from that of the starting materials (a) and (b). The diffraction pattern is very similar to that of the compound (III) in which $R^1$ is H.

Other preferred isoindoline pigments are those which contain an isoindoline compound of the formula V as (a) and one or more isoindoline compounds of the formula VI as (b) and in which $R^2$ is —CN, —CONH—$R^4$, 2-quinazolonyl, 2-quinoxazolonyl or 2-benzamidozolyl and $R^4$ is hydrogen, $C_1$-$C_4$-alkyl or phenyl, and the phenyl radical $R^4$ and/or the heterocyclic radicals stated for $R^2$ are unsubstituted or substituted by fluorine, chlorine, bromine, carbamyl, N-$C_1$-$C_4$-alkylcarbamyl, N-phenylcarbamyl, $C_1$-$C_4$-alkyl, $C_1$-$C_4$-alkoxy, benzoylamino, $C_1$-$C_4$-alkanoylamino, $C_1$-$C_4$-alkoxycarbonyl or phenoxycarbonyl.

Among the last-mentioned pigments consisting of (V) and (VI), noteworthy ones are those where, in (VI), $R^2$ is —CONH—$R^6$ or 2-quinazolonyl and $R^6$ is hydrogen or $C_1$-$C_4$-alkyl or is phenyl which is unsubstituted or substituted by fluorine, chlorine, bromine, methyl, ethyl, ethoxy, methoxy, carbomethoxy, acetylamino, carbamyl or benzoylamino.

Among the last-mentioned isoindoline pigments consisting of (V) and (VI), particularly noteworthy ones are those where, in (VI), $R^2$ is N-phenylcarbamyl which is unsubstituted or substituted by fluorine, chlorine, bromine, methyl and/or methoxy, preferably carbamyl or N-methylcarbamyl, or N-phenylcarbamyl which is unsubstituted or substituted by chlorine and/or methyl.

The amount of (b) is from 2 to 50% by weight, based on (a). Pigments which contain from 5 to 15% by weight, based on (a), of (b) possess maximum properties such as color strength and fastness properties.

The novel isoindoline pigments possessing high color strength (pigmentary forms) are obtained by milling (a) and (b) together and then heating the finished mill base in the organic liquid or in a mixture of an organic liquid with water.

The mixture of (a) and (b) is milled in the dry state until the primary particle size is less than 0.2 μm, preferably ≤0.1 μm. The finished mill base is in the form of agglomerates which are from 2 to >200 μm in size and are composed of the primary particles.

Milling can also be carried out in the presence of solid assistants, such as inorganic or organic salts, eg. rock salt, sodium sulfate, calcium chloride or potassium chloride, sodium acetate, sodium benzoate or alkali metal salts of phthalic acid. However, milling is preferably carried out in the absence of assistants.

Milling can be carried out in comminution apparatuses conventionally used in the pigment sector for fine milling. Industrially, it is preferably carried out in vibratory mills or ball mills, while planetary ball mills are also suitable for small batches.

Milling gives a greenish yellow or yellow mill base which consists of agglomerates which are from 2 to >200 μm in size and are composed of the primary particles. In the X-ray pattern of the mill base, the reflections which are very pronounced in the pattern of the starting pigments I and II are diffuse, and the half widths of the reflection bands are as a rule doubled.

The finished mill base is then heated in an organic liquid or a mixture of an organic liquid with water.

Suitable organic liquids are aliphatic and cyclo-aliphatic alcohols, esters, aliphatic carboxylic acids, aliphatic carboxamides, lactams, ethers, ketones, phenols and mixtures of these.

It is advantageous to use phenols or carboxamides of $C_1$-$C_4$-alkanoic acids, in particular their bis-N,N-$C_1$-$C_6$-alkylamides, eg. N,N-dimethylformamide, N,N-diethylformamide, N,N-dipropylformamide, N,N-dimethylacetamide, N,N-diethylacetamide, N,N-dipropylacetamide, N,N-dimethylpropionamide or N,N-diethylpropionamide, or lactams, eg. N-methylpyrrolidone, or mixtures of these.

Mixtures of these amides with water may also be used.

The phenols have proven particularly advantageous organic liquids.

Examples of suitable phenols are unsubstituted phenol, and alkylphenols and chlorophenols, eg. cresols, xylenols and chlorophenols.

Phenol is a particularly preferred organic liquid.

The amount of liquid is not critical if the mixture can be mixed thoroughly. For economic reasons, the amount of organic liquid is kept as small as possible. As a rule, the heat treatment is carried out using the organic liquid in an amount which is from 6 to 20, preferably from 8 to 15, times the weight of the mill base.

The mill base is advantageously heated to 50°–200° C. in the organic liquid, and is kept at this temperature, the finishing treatment being complete after from 1 to 20 hours.

Pigments based on (III) which have particularly high color strength and in some cases are also transparent are obtained by heating at 80°–120° C. for from 5 to 10 hours.

High-hiding pigments based on (V) which have particularly high color strength are obtained by heating at 150°–200° C. for from 5 to 15 hours.

The novel pigmentary forms are isolated from the treatment mixture in a conventional manner, for example by filtration and washing.

In the case of liquids which are solid at above room temperature, the treatment mixture is advantageously diluted with a water-miscible solvent, such as methanol, ethanol, isopropanol or acetone, and the pigment is then isolated.

The Examples which follow illustrate the invention. Parts are by weight.

EXAMPLE 1

(a) 47.5 parts of a pigment of the formula (III) where $R^1$ is H (prepared as described in German Published Application DAS No. 2,757,982, Example 3) and 2.5 parts of a pigment of the formula (IV) where $R^5$ is —$CH_3$ and $R^3$ is H (prepared as described in U.S. Pat. No. 4,316,023, Example 1) are milled for 4 hours in a planetary ball mill, the grinding medium comprising 20 agate balls of 1 cm diameter and 20 agate balls of 2 cm diameter.

(b) The highly compacted, greenish yellow mill base which consists of agglomerates of primary particles of 0.1 um is introduced into 500 parts of phenol, and the mixture is heated to 110° C. and kept at this temperature for 10 hours. It is then cooled to 70° C. and diluted with 100 parts of methanol, after which the pigment is filtered off, washed with methanol and dried. 47 parts of a pigment are obtained which, compared with the pigment of German Published Application DAS No. 2,757,982, Example 3, or with the pure pigment (III) where $R^1$ is H, which has been treated in the same manner, gives much more intense and opaque colorations in baking finishes.

EXAMPLE 2

The procedure described in Example 1 (a) and (b) is followed, except that 45 parts of the compound of the formula (III) where $R^1$ is H and 5 parts of the compound of the formula (IV) where $R^5$ is —$CH_3$ and $R^3$ is H are used.

47 parts of a pigment are obtained which, compared with the pigment of British Pat. No. 2,013,230, Example 3, or with the pure pigment of the formula (III) which has been treated in the same manner, gives much more intense and opaque colorations in baking finishes.

EXAMPLE 3

The procedure described in Example 2 is followed, except that 45 parts of the compound of the formula (III) where $R^1$ is H and, as (b), 5 parts of the compound (IV) where $R^5$ is H and $R^3$ is —$CH_3$ are used. The finished mill base is stirred for 2 hours at 105° C. and for 4 hours at 110° C.

47 parts of a pigment are obtained which, compared with the pigment of German Published Application DAS No. 2,757,982, Example 3, or with the pure pigment (III) where $R^1$ is H, which has been treated in the same manner, gives much more intense colorations in baking finishes. The pigment obtained gives an X-ray diffraction pattern which differs from that of the starting compounds and is very similar to the diffraction pattern of the compound (III) where $R^1$ is —$CH_3$.

EXAMPLE 4

The procedure described in Example 3 is followed, except that 30 parts of the compound (III) where $R^1$ is H and, as (b), 20 parts of the compound (IV) where $R^5$ is H and $R^3$ is —$CH_3$ are used. The finished mill base is stirred for 2 hours at 110° C. and for 4 hours at 115° C.

46 parts of a pigment are obtained which, compared with the pigment of British Pat. No. 2,013,230, Example 3, or with the pure pigment (III) where $R^1$ is H, which has been treated in the same manner, gives much more intense and transparent colorations in baking finishes.

EXAMPLE 5

The procedure described in Example 2 is followed, except that 45 parts of the compound (III) where $R^1$ is H and, as (b), 5 parts of the compound (IV) where $R^5$ is H and $R^3$ is phenyl are used. The finished mill base is stirred for 8 hours at 105° C.

47 parts of a pigment are obtained which has properties similar to the pigments of Examples 1 and 2.

EXAMPLE 6

The procedure described in Example 1 (a) and (b) is followed, except that the finished mill base is stirred for 10 hours at 140° C. in 500 parts of dimethylformamide. A pigment having similar properties is obtained.

EXAMPLE 7

The procedure described in Example 4 is followed, except that (a) comprises 30 parts of the compound (III) where $R^1$ is —$CH_3$ and (b) comprises 20 parts of the compound (IV) where $R^5$ is H and $R^3$ and —$CH_3$. The finished mill base is stirred for 2 hours at 105° C. and then for 4 hours at 115° C.

46 parts of a pigment are obtained which, compared with the pigment of U.S. Pat. No. 4,316,023, Example 1, or with the pigment (III) where $R^1$ is —$CH_3$, which has been treated in the same manner, gives substantially more intense and particularly transparent colorations in baking finishes and in printing inks.

The resulting pigment gives an X-ray diffraction pattern which differs from that of the starting compounds, the diffraction pattern being very similar to that of the compound (III) where $R^1$ is H.

A similar pigment giving the same diffraction pattern is obtained if 25 parts of III, where $R^1$ is —$CH_3$, are used as (a), and 25 parts of IV, where $R^3$ is —$CH_3$ and $R^5$ is H, are used as (b).

EXAMPLE 8

(a) 45 parts of a compound (V) (prepared as described in U.S. Pat. No. 4,166,179, Example 1) and 5 parts of a compound (VI) where $R^2$ is —$CONHCH_3$ (prepared as described in German Published Application DAS No. 2,914,086, Example 1) are milled in a planetary ball mill for 4 hours, the grinding medium comprising 20 agate balls of 1 cm diameter and 20 agate balls of 2 cm diameter.

(b) The highly compacted, yellow mill base which consists of agglomerates of primary particles of <0.1 μm is introduced into 500 parts of phenol, and the mixture is heated to 170° C. and kept at this temperature for 7 hours. It is cooled to 70° C. and then diluted with 100 parts of methanol, after which the pigment is filtered off, washed with methanol and dried. 47 parts of a pigment are obtained which, compared with the pigment of U.S. Pat. No. 4,166,179, Example 1, or with the pure pigment (V), which has been treated in the same manner, gives much more intense and opaque colorations in baking finishes.

EXAMPLE 9

The procedure described in Example 8 (a) and (b) is followed, except that 40 parts of the compound (V) stated there and 10 parts of the compound (VI) where $R^2$ is $CONH_2$ are used.

47 parts of a pigment are obtained which, compared with the pigment of U.S. Pat. No. 4,166,179, Example 1, or with the pure pigment (V), which has been treated in the same manner, gives much more intense and opaque colorations in baking finishes.

EXAMPLE 10

The procedure described in Example 8 is followed, except that 35 parts of the compound (V) and, as (b), 15 parts of the compound (VI) where $R^2$ is $-CONHCH_3$ are used. The finished mill base is stirred for 1 hour at 110° C. and for 6 hours at 120° C.

47 parts of a pigment are obtained which, compared with the pigment of U.S. Pat. No. 4,166,179, Example 1, or with the pure pigment (V), which has been treated in the same manner, gives much more intense and opaque colorations in baking finishes.

EXAMPLE 11

The procedure described in Example 8 is followed, except that (a) comprises 45 parts of the compound (V) and (b) comprises 5 parts of the compound (VI) where $R^2$ is $-CONH-$. The finished mill base is stirred for 10 hours at 170° C.

46 parts of a pigment are obtained which, compared with the pigment of U.S. Pat. No. 4,166,179, Example 1, or with the pure pigment (V), which has been treated in the same manner, gives much more intense and opaque colorations.

EXAMPLES 12 TO 29

The procedure described in Example 11 is followed, except that in each case 5 parts of the isoindoline compound of the formula (VI), where $R^2$ has the meaning given in the table, are used as (b). The resulting pigments give very intense and opaque reddish yellow colorations in finishes.

| Example | $R^2$ |
|---|---|
| 12 | $-C(=O)-NH-C_6H_4-Cl$ (para) |
| 13 | $-C(=O)-NH-C_6H_4-Cl$ (meta) |
| 14 | $-C(=O)-NH-C_6H_4-CH_3$ (para) |
| 15 | $-C(=O)-NH-C_6H_4-CH_3$ (meta) |
| 16 | $-C(=O)-NH-C_6H_4-CH_3$ (ortho) |
| 17 | $-C(=O)-NH-C_6H_3(CH_3)_2$ (2,4-dimethyl) |
| 18 | $-C(=O)-NH-C_6H_4-OCH_3$ (para) |
| 19 | $-C(=O)-NH-C_6H_4-OCH_3$ (meta) |
| 20 | $-C(=O)-NH-C_6H_3(CH_3)(Cl)$ |
| 21 | $-C(=O)-NH-C_6H_4-F$ (meta) |
| 22 | $-C(=O)-NH-C_6H_4-CO_2CH_3$ (ortho) |
| 23 | $-C(=O)-NH-C_6H_4-NHCOCH_3$ (para) |

-continued

| Example | R² |
|---|---|
| 24 | −C(=O)−N(H)−C₆H₄−Br |
| 25 | −C(=O)−N(H)−C₆H₄−NHCO−C₆H₅ |
| 26 | −C(=O)−N(H)−C₆H₄(ortho-CONH₂) |
| 27 | −C(=O)−N(H)−C₆H₄(ortho-OCH₃) |
| 28 | quinoxalinone structure |
| 29 | quinazolinone structure |

USE EXAMPLE 1

Finish 10 parts of the pigment obtained as described in Example 8 and 95 parts of a baking finish mixture which contains 70% of coconut alkyd resin (60% strength solution in xylene) and 30% of melamine resin (about 55% strength solution in butanol/xylene) are milled in an attrition mill. After application and baking for 30 minutes at 120° C., reddish yellow full-shade coatings having good lightfastness and fastness to overspraying are obtained. Admixing titanium dioxide gives reddish yellow white reductions.

If the pigments obtained as described in Examples 9 to 29 are used, coatings having similar properties are obtained.

USE EXAMPLE 2

Plastic 0.5 parts of the pigment from Example 8 is applied onto 100 parts of standard-grade polystyrene granules by tumbling, and the colored granules are homogenized by extrusion at from 190° to 195° C. Lightfast reddish yellow extrudates are obtained.

If a mixture consisting of 0.5 part of dye and 1 part of titanium dioxide is used, opaque, reddish yellow colorations are obtained.

If the pigments obtained as described in Examples 9 to 29 are used, reddish colorations having good fastness properties are likewise obtained.

USE EXAMPLE 3

Printing ink 8 parts of the pigment obtained as described in Example 8, 40 parts of a colophony resin modified with phenol/formaldehyde, and from 55 to 65 parts of toluene are mixed thoroughly in a dispersing unit. The resulting yellow toluene-based gravure printing ink gives lightfast prints. Similar results are obtained if the pigments of Examples 9 to 29 are used instead of the pigment obtained as described in Example 8.

USE EXAMPLE 4

Finish 10 parts of the pigment obtained as described in Example 1 and 95 parts of baking finish mixture which contains 70% of coconut alkyd resin (60% strength solution in xylene) and 30% of melamine resin (about 55% strength solution in butanol/xylene) are milled in an attrition mill. After application and baking for 30 minutes at 120° C., greenish yellow full-shade coatings having good lightfastness and fastness to overspraying are obtained. Admixing titanium dioxide gives greenish yellow white reductions.

If the pigments obtained as described in Examples 2 to 7 are used, coatings having similar properties are obtained.

USE EXAMPLE 5

Plastic 0.5 part of the pigment from Example 1 is applied onto 100 parts of standard-grade polystyrene granules by tumbling, and the colored granules are homogenized by extrusion at from 190° to 195° C. Lightfast greenish yellow extrudates are obtained.

If a mixture consisting of 0.5 part of dye and 1 part of titanium dioxide is used, opaque, greenish yellow colorations are obtained.

If the pigments obtained as described in Examples 2 to 7 are used, greenish yellow colorations having good fastness properties are likewise obtained.

USE EXAMPLE 6

Printing ink 8 parts of the pigment obtained as described in Example 7, 40 parts of a colophony resin modified with phenol/formaldehyde, and from 55 to 65 parts of toluene are mixed thoroughly in a dispersing unit. The resulting yellow toluene-based gravure printing ink gives highly transparent, lightfast prints. Similar results are obtained if the pigments of Examples 1 to 6 are used instead of the pigment obtained as described in Example 1.

We claim:

1. An isoindoline pigment having high color strength and containing
   (a) a compound of the formula

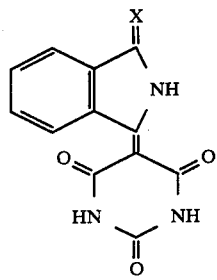

(I)

where X is

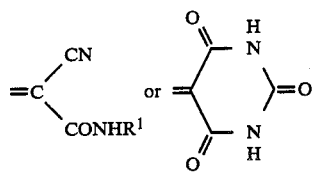

and $R^1$ is hydrogen or methyl, and
(b) from 2 to 50% by weight, based on (a), of one or more isoindoline compounds of the formula

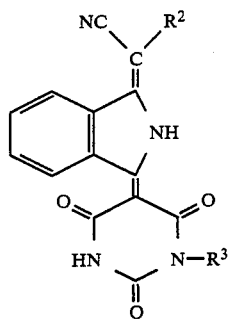

(II)

where $R^2$ is —CN, —CONH—$R^4$, 2-quinazolonyl, 2-quinoxazolonyl or 2-benzimidazolyl, $R^3$ is hydrogen or $C_1$-$C_4$-alkyl or is phenyl which is unsubstituted or substituted by chlorine, bromine, methyl, ethyl, methoxy or ethoxy, $R^4$ is hydrogen, $C_1$-$C_4$-alkyl or phenyl, and the phenyl radical $R^4$ and the heterocyclic radicals stated for $R^2$ are unsubstituted or substituted by chlorine, fluorine, bromine, carbamyl, N-$C_1$-$C_4$-alkylcarbamyl, N-phenyl-carbamyl, $C_1$-$C_4$-alkyl, $C_1$-$C_4$-alkoxy, benzoylamino, $C_1$-$C_4$-alkanoylamino, $C_1$-$C_4$-alkoxycarbonyl or phenoxycarbonyl, and when X is

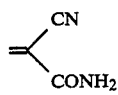

$R^3$ or $R^4$ cannot be hydrogen, or when X is

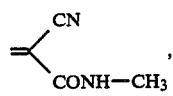

$R^3$ cannot be hydrogen, where the pigment is obtained by dry-blending a mixture of (I) and (II) until the primary particles are ≦0.2 μm, and then heating the finely divided agglomerated mill base in an organic liquid or in a mixture of water with an organic liquid selected from the group consisting of aliphotic alcohols, cycloaliphatic alcohols, esters, alphatic carboxylic acids, aliphatic carboxamides, lactams, ethers, ketones, phenols and mixtures thereof or in a mixture of water with said organic liquid.

2. The isoindoline pigment as claimed in claim 1, wherein (a) is an isoindoline compound of the formula

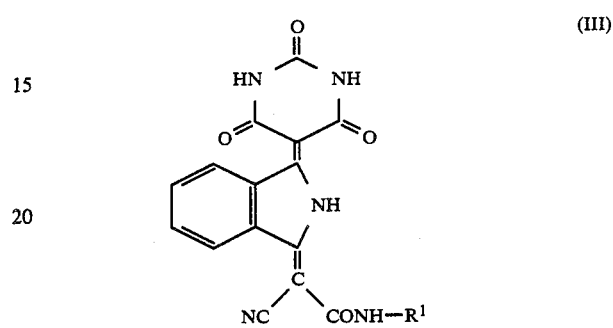

(III)

wherein $R^1$ is hydrogen or methyl, and (b), is an isoindoline compound of the formula

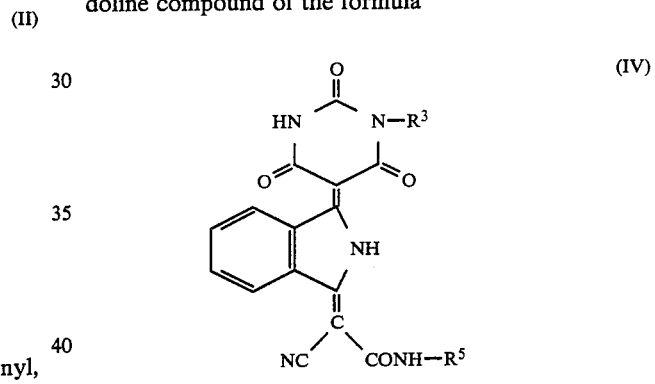

(IV)

where $R^3$ is hydrogen or $C_1$-$C_4$-alkyl or is phenyl which is unsubstituted or substituted by chlorine, bromine, methyl, ethyl, methoxy or ethoxy and $R^5$ is hydrogen or $C_1$-$C_4$-alkyl, and when $R^1$ is hydrogen, $R^3$ or $R^5$ cannot be hydrogen, or when $R^1$ is methyl, $R^3$ cannot be hydrogen.

3. The isoindoline pigment as claimed in claim 2, wherein $R^1$ is hydrogen or methyl, $R^3$ is methyl, ethyl, or phenyl and $R^5$ is methyl or ethyl, and $R^3$ or $R^5$ may furthermore be hydrogen, and if $R^1$ is methyl, $R^3$ cannot be hydrogen.

4. The isoindoline pigment as claimed in claim 2, wherein $R^1$ is hydrogen, one of the radicals $R^3$ and $R^5$ is hydrogen and the other is ethyl or methyl.

5. The isoindoline pigment as claimed in claim 4, wherein $R^3$ or $R^5$ is methyl.

6. The isoindoline pigment as claimed in claim 2, wherein $R^1$ is methyl, $R^3$ is ethyl, phenyl or methyl and $R^5$ is hydrogen.

7. The isoindoline pigment as claimed in claim 6, wherein $R^3$ is methyl.

8. An isoindoline pigment containing
(a) an isoindoline compound of the formula:

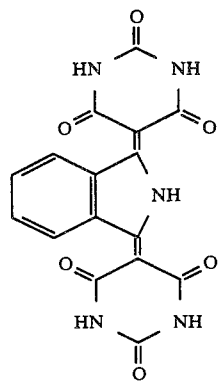

and (b) from 2 to 50% by weight, base on (a), of an isoindoline compound of the formula:

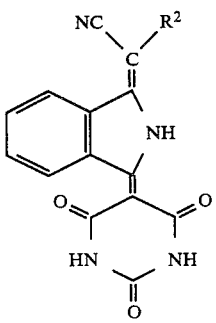

where $R^2$ is —CN, —CONH—$R^4$, 2-quinazolonyl, 2-quinoxazolonyl or 2-benzimidazolyl and $R^4$ is hydrogen, $C_1$–$C_4$alkyl or phenyl, and the phenyl radical $R^4$ and the heterocyclic radicals stated for $R^2$ are unsubstituted or substituted by fluorine, chlorine, bromine, carbamyl, N-$C_1$–$C_4$-alkylcarbamyl, N-phenylcarbamyl, $C_1$–$C_4$-alkyl, $C_1$–$C_4$-alkoxy, benzoylamino, $C_1$–$C_4$-alkanoylamino, $C_1$–$C_4$-alkoxycarbonyl or phenoxycarbonyl, where the pigment is obtained by dry-blending a mixture of (V) and (VI) until the primary particles are $\leq 0.2$ μm and then heating the finely divided agglomerated mill base in an organic liquid selected from the group consisting of aliphatic alcohols, cycloaliphatic alcohols, esters, aliphatic carboxylic acids, aliphatic carboxamides, lactams, ethers, ketones, phenols and mixtures thereof or in a mixture of water with said organic liquid.

9. The isoindoline pigment as claimed in claim 8, wherein $R^2$ is —CONH—$R^6$ or 2-quinazolonyl and $R^6$ is hydrogen or $C_1$–$C_4$-alkyl or is phenyl which is unsubstituted or substituted by fluorine, chlorine, bromine, methyl, ethyl, methoxy, ethoxy, carbomethoxy, acetylamino, carbamyl or benzoylamino.

10. The isoindoline pigment as claimed in claim 8, wherein $R^2$ is carbamyl or N-methylcarbamyl or is N-phenylcarbamyl which is unsubstituted or monosubstituted or disubstituted by fluorine, chlorine, bromine, methyl or methoxy.

11. The isoindoline pigment as claimed in claim 8, wherein the amount of (b) is from 5 to 15% by weight, base on (a).

12. The isoindoline pigment as claimed in claim 9, wherein the amount of (b) is from 5 to 15% by weight, based on (a).

13. The isoindoline pigment as claimed in claim 10, wherein the amount of (b) is from 5 to 15% by weight, based on (a).

14. A process for the preparation of an isoindoline pigment having high color strength, wherein a mixture of:

(a) an isoindoline compound of the formula:

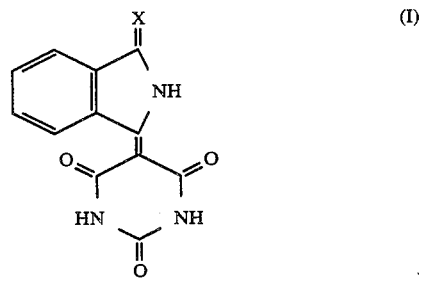

where X is

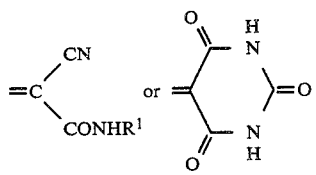

and $R^1$ is hydrogen or methyl, and (b) from 2 to 50% by weight, based on (a), of one or more isoindoline compounds of the formula

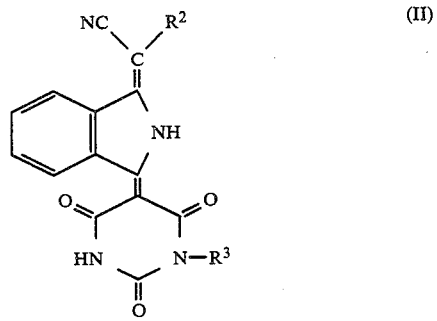

where $R^2$ is —CN, —CONH—$R^4$, 2-quinazolonyl, 2-quinoxazolonyl or 2-benzimidazolyl, $R^3$ is hydrogen or $C_1$–$C_4$-alkyl or is phenyl, which is unsubstituted or substituted by chlorine, bromine, methyl, ethyl, methoxy or ethoxy and $R^4$ is hydrogen, $C_1$–$C_4$-alkyl or phenyl, and the phenyl radical $R^4$ and the heterocyclic radicals stated for $R^2$ are unsubstituted or substituted by chlorine, fluorine, bromine, carbamyl, N-$C_1$–$C_4$-alkylcarbamyl, N-phenylcarbamyl, $C_1$–$C_4$-alkyl, $C_1$–$C_4$-alkoxy, benzoylamino, $C_1$–$C_4$-alkanoylamino, $C_1$–$C_4$-alkoxycarbonyl or phenoxycarbonyl, and when X is

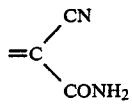

$R^3$ or $R^4$ cannot be hydrogen, or when X is

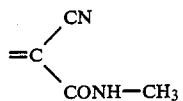

$R^3$ cannot be hydrogen, is dry-blended until the primary particles are $\leq 0.2$ μm in size, and the finished mill base which consists of agglomerates of from 1 to $\leq 200$ μm, which are composed of the primary particles, is heated at from 50° to 200° C. in an organic liquid selected from the group consisting of aliphatic alcohols, cycloaliphatic alcohols, esters, aliphatic carboxylic acids, aliphatic carboxamides, lactams, ethers, ketones, phenols and mixtures thereof or in a mixture of said organic liquid with water, and the pigment is isolated.

15. A process as claimed in claim 14, wherein the organic liquid used is an N,N-bis-$C_1$-$C_4$-alkylamide of a $C_1$-$C_4$-alkanoic acid, or N-methylpyrrolidone or a phenol.

16. A process as claimed in claim 15, wherein the organic liquid used is phenol.

* * * * *